United States Patent [19]

Rutz

[11] Patent Number: 5,341,547
[45] Date of Patent: Aug. 30, 1994

[54] APPARATUS FOR THE TREATMENT AND BIAXIAL STRETCHING AND AXIAL SHRINKING OF THERMOPLASTIC FILM WEB

[75] Inventor: Andreas Rutz, Lindau, Fed. Rep. of Germany

[73] Assignee: Lindauer Dornier Gesellschaft mbH, Lindau, Fed. Rep. of Germany

[21] Appl. No.: 140,268

[22] Filed: Oct. 21, 1993

[30] Foreign Application Priority Data

Oct. 22, 1992 [DE] Fed. Rep. of Germany ....... 4235648

[51] Int. Cl.⁵ .............................................. D06C 3/02
[52] U.S. Cl. ......................................... 26/72; 26/89; 26/93
[58] Field of Search ............... 26/72, 73, 93, 91, 88, 26/89, 52, 71, 87; 264/288.4, 290.2, 289.6

[56] References Cited

U.S. PATENT DOCUMENTS

| | | |
|---|---|---|
| 3,150,433 | 9/1964 | Kampf . |
| 3,172,150 | 3/1965 | Dornier ................................ 26/72 |
| 3,932,919 | 1/1976 | Hutzenlaub ........................ 26/73 |
| 4,625,372 | 12/1986 | Hufnagel et al. .................... 26/73 |
| 4,890,365 | 1/1990 | Langer . |

FOREIGN PATENT DOCUMENTS

| | | |
|---|---|---|
| 0291775 | 11/1988 | European Pat. Off. . |
| 1629562 | 2/1971 | Fed. Rep. of Germany . |
| 3207384 | 9/1982 | Fed. Rep. of Germany . |
| 1435317 | 12/1966 | France ................................. 26/73 |
| 52-22669 | 6/1977 | Japan .................................. 26/73 |

*Primary Examiner*—Clifford D. Crowder
*Assistant Examiner*—Amy B. Vanatta
*Attorney, Agent, or Firm*—W. G. Fasse; W. F. Fasse

[57] ABSTRACT

A thermoplastic film stretching apparatus includes a first and a second separate transport chain system including the respective guide tracks and tentering clamps. The tentering clamps are guided without the conventional chain plate connections. The first chain transport system performs the tentering clamp transport from the inlet of the system to the setting zone of the system, where the tentering clamps are released by the first transport chain system and taken over by the second transport chain system. The transport of the tentering clamps by the second system through the setting zone, the cooling zone, and along the way to the outlet zone of the film stretcher, takes place with a smaller transport speed than that of the first transport system. The speed difference between the first and second transport chains is the measure for the film shrinkage to be imposed onto the thermoplastic film.

14 Claims, 11 Drawing Sheets

APPARATUS FOR THE TREATMENT AND BIAXIAL STRETCHING AND AXIAL SHRINKING OF THERMOPLASTIC FILM WEB

FIELD OF THE INVENTION

The invention relates to an apparatus for simultaneously stretching a thermoplastic film web in two axial directions, namely in the longitudinal direction and in a crosswise direction extending perpendicularly to the longitudinal direction and then shrinking the biaxially stretched film web in its longitudinal axial direction. For this purpose, the film web is carried through the apparatus by tentering clamps that grip the edges of the film web. The tentering clamps are guided along respective guide tracks.

BACKGROUND INFORMATION

Machines for the above purpose include tentering clamps that have a clamping portion and a roller section carried by a clamp body. The guide roller or rollers of the roller section travel along guide tracks which have an inlet section, an intermediate section, and an outlet section or zone. Each section has two portions, namely one portion for each film web edge. The intermediate section forms treatment zones, and the inlet section and the outlet section extend in parallel to each other, however spaced from each other in the axial direction. The portions of the intermediate section with the treatment zone or zones diverge to form a bridging connection between the inlet section and the outlet section. The guide track portions of the outlet section are spaced from each other in the crosswise direction at a distance larger than the respective spacing of the guide track portions of the inlet section. The tentering clamps are secured to pulling devices referred to herein as tentering chains that travel along the guide tracks in an endless manner. The endless tentering chains travel around a guiding device at the inlet section of the machine and the chains are driven by a drive device such as a wheel at the outlet end of the outlet section.

German Patent Publication DE-AS 1,629,562 (Tsuruta et al.), published on Feb. 4, 1971, relates to a method for the biaxial stretching of film webs made of polyamide. The apparatus used in German Patent Publication 1,629,562 comprises tentering chains in the form of articulated conveyors. These articulated conveyors carry tentering clamps arranged in sequence along the conveyors. Neighboring tentering clamps are interconnected by guide rods that zig-zag back and forth along and between two guide tracks, which guide the tentering chain in the stretching and setting zones. The two guide tracks of each tentering chain are so arranged that with the help of the articulating guide rods, the spacing between the two guide tracks becomes increasingly smaller in the stretching zone and increasingly larger in the setting zone. Tentering chains of this type pose the problem that obtaining a change in the longitudinal stretching ratio or a change in the longitudinal shrinking ratio can be obtained only with a substantial technical effort and expense in that it is necessary to change the position of the two guide tracks of each tentering chain relative to each other. Such positional change is not simple.

U.S. Pat. No. 3,150,433 (Kampf et al.), issued on Sep. 29, 1964, discloses a stretching machine in which the edges of a film web are gripped by tentering clamps which travel along endless revolving guide tracks. The individual tentering clamps are not integrated into tentering chains. Rather, the tentering clamps, also referred to as grippers, are transported individually. For this purpose, each tentering clamp or gripper has a pin that engages a threaded rotating spindle. Two diverging spindles are arranged to slant relative to each other to increase the spacing between the two tentering devices in the diverging treatment section. The rotation of the spindles which are arranged on the left and right side alongside the film web, transport the grippers with a slant relative to the longitudinal direction in the treatment zone. Further, the pitch of the spindle threading increases in the transport direction so that the relative spacing between the grippers is increased, thereby causing a longitudinal stretching of the film web. A machine of this type is limited to a fixed stretching ratio in the longitudinal direction, because the pitch of the threading in the spindle is fixed. Any change in the stretching ratio would require the replacement of these spindles. Another drawback resides in the fact that the production of such spindles is quite involved and the spindles also have a limited length. Spindles that are too long tend to bend unless they are rather bulky. Thus, these spindles can be employed only along a straight path of limited length. A further drawback is seen in the fact that a longitudinal shrinking of the film web is not possible in such an apparatus as disclosed in U.S. Pat. No. 3,150,433.

German Patent Publication DE 3,207,384 (Rottensteiner), published on Sep. 23, 1982, discloses a film web stretching apparatus permitting a biaxial stretching in which the individual tentering clamps are carried and transported by endless tentering chains. Each tentering clamp body carries gear wheels that mesh with corresponding elements in the tentering chains, whereby rotation of these gear wheels causes a displacement of the tentering clamps along the tentering chains. Such displacement increases or decreases the spacing between neighboring clamps for the intended stretching operation. The gear wheels themselves are driven on each tentering clamp by respective drive devices that are controllable. For example, electric motors or controllable gear drives are suitable for this purpose. Thus, the mutual spacing between neighboring tentering clamps along the respective tentering chain is adjustable by an independent, outwardly controllable control member such as the above mentioned electric motor or gear drive. In this type of construction longitudinal force components are distributed onto each individual tentering clamp while the main forces for the movement of the tentering chains are introduced into the respective tentering chain. The tentering chains are not elastic and thus can be dimensioned without difficulties for the load that is caused by the above mentioned longitudinal force components. The apparatus of German Patent DE 3,207,384 permits the simultaneous biaxial stretching of the film webs in a wide range and with controllable stretching ratios and/or shrinking ratios. In fact, it is possible with this known apparatus, to adjust individually different ratios along the length of the treatment section of the apparatus. Further, the known tentering clamps are equipped with a roller guide so that high transport speeds can be realized while still maintaining a quiet and smooth run. However, these advantages are bought with a substantial effort and expense for control components, gear drives, motors, and so forth. The installation of these components on the tentering clamps along the guide track or tracks is frequently not easy to realize, especially because these movable components must travel through a hot environment in the treatment chamber and they must remain fully operational in such hot environment. Another drawback is seen in that the tentering chains are not easily accessible for maintenance work, which may become frequent since these chains run along the guide track with different speeds. Additionally, the treatment of film webs in this context requires not only a precisely controlled stretching, but also a precisely controlled shrinking during the setting operation or treatment. Thus, for the shrinking it is necessary that the spacings between neighboring tentering clamps along the tentering chains must also be precisely controlled during the shrinking of the film web to assure the desired degree or measure of shrinkage.

European Patent Publication 0,291,775 (Langer), published on Nov. 23, 1988, discloses an apparatus for the simultaneous biaxial treatment of film webs. European Patent Publication 0,291,775 corresponds to U.S. Pat. No. 4,890,365 (Langer), issued on Jan. 2, 1990. The edges of the film web are clamped in the Langer apparatus by tentering clamps that are mounted to chain links forming chains running around an endless track. The connection between two successive tentering clamps is established by two chain links journalled to each other. These chain links can be brough in pairs into a lengthwise extending arrangement or into a kinked arrangement and vice versa. This positional change of the chain links is controlled by control rails arranged outside the chain guide track, whereby one of the two chain links is constructed as a bellcrank carrying at a free end of one of its arms, a roller engaging the control rail. Thus, the spacing between two successive tentering clamps can be shortened or lengthened, thereby controlling the film stretching and the film shrinking with a fine ratio. The control features in this known Langer apparatus are quite substantial and leave room for improvement.

OBJECTS OF THE INVENTION

In view of the foregoing it is the aim of the invention to achieve the following objects singly or in combination:

to construct a film web stretching apparatus in such a way that a simultaneous biaxial and axial treatment of the film web is possible, while simultaneously avoiding external devices for the control, especially of the longitudinal shrinking;

to provide a tentering chain or pulling device for transporting the tentering clamps through the machine, whereby the chain or device is capable of taking up high stretching forces while simultaneously assuring a certain and safe entraining of the tentering clamps in the stretching zone;

the tentering chain or pulling device shall have a fixed pitch expressed as an on-center spacing between neighboring tentering clamps;

the apparatus shall be so constructed that a longitudinal shrinking range for the film web shall be precisely defined;

the tentering chain or other clamp transport device shall be lightweight and accommodate, or rather entrain the tentering clamps with a fixed pitch;

to assure a certain and safe threading-in of the tentering clamps as they travel from a slower speed first transport system into a higher speed second transport system without releasing the clamped margins of the film web by the tentering clamps; and to construct the apparatus in such a manner that a simple retooling is possible for converting the apparatus in a conveniently operating stretching machine.

SUMMARY OF THE INVENTION

The apparatus according to the invention comprises first and second separately driven transport systems for the tentering clamps. The systems operate at different transport speeds. Each transport system comprises an upper system section and a lower system section for guiding the tentering chains or devices that comprise chain links. The tentering clamps are arranged in a free-running or free-wheeling manner in the system sections. Each tentering clamp comprises a clamping member and a roller section. The operation is such that each tentering clamp is engaged in a force-transmitting manner within the transport systems only temporarily. Transition guide tracks are provided for linking the two transport systems and for guiding the tentering clamps out of the first transport system and into the second transport system. Each of the tentering clamps is equipped for its transport in the first transport system with a U-shaped recess positioned on the side opposite the side of the clamping member. A free cylindrical portion of a first chain pin reaches into the U-shaped recess while second chain pins of chain links of the first tentering chain device reach into a space between neighboring roller sections or members. The tentering clamps are transported in the second transport system with the aid of an entraining element arranged on the side of each roller section opposite of the clamping member. At least one such entraining element is provided for each tentering clamp. Each chain link of the tentering chain of the second transport system is equipped with a further entraining element arranged for cooperation with the first mentioned entraining element independently of the pitch of the tentering chain.

As stated above, the present apparatus has two separately constructed and separately driven transport systems, each including its own guide tracks, whereby the individual tentering clamps that comprise a clamping member and a roller section travel from one transport system to the other so that each system engages the tentering clamps only temporarily. On their travel from one transport system to the other, the clamps are guided by transition guide tracks. The shrinking of the film web already begins during the transfer travel of the tentering clamps and continues during transportation by the second transport system. The transfer of the tentering clamps takes place on the transition guide tracks which link the separate guide tracks of the two transport systems to form a linked guide track, wherein each transport system has its own tentering chain drive device, so that different tentering chain speeds can be established in each transport system. Although the construction of the two tentering chains in each system is different, the guide tracks for both systems are practically identical to each other. The tentering chain in the first separate transport system transports the tentering clamps through the inlet section and through the treatment section which includes a heating zone, a stretching zone, and a setting zone. The second transport system transports the tentering clamps all the way to the outlet of the apparatus. For this purpose, the tentering clamps are transferred in the setting zone from the tentering chains of the first transport system which releases the tentering clamps, to the tentering chains of the second system which continues the transport of the tentering clamps. Drive sprocket wheels return the tentering chains of the first transport system to the inlet zone. For this transport of the tentering clamps it is necessary that entraining elements of the tentering chain engage into the tentering clamp body, and into the space between two neighboring tentering clamp bodies. For this purpose, the roller section of each tentering clamp is provided with a vertically extending U-shaped recess positioned centrally and opposite the roller section surface. A chain pin of a chain link of the first tentering chains function as an entraining element and engages into the U-shaped recess during times when the first transport system advances the tentering clamps. The next chain pin of the chain link engages between two neighboring tentering clamps for the sample purpose, namely for advancing the tentering clamps. The tentering chains are driven in a conventional manner, for example, by said drive sprocket wheels or the like.

The tentering chains of the second separate transport system take over the tentering clamps from the first system after the latter have released these clamps one after the other as they reach the transfer area. The second tentering chains transport the tentering clamps with a smaller speed through the setting zone, through the cooling zone, and to the outlet of the machine where the individual clamps sequentially release the treated film web. Each tentering chain of the second transport system travels around its own drive sprocket wheel in the second system. The drive sprocket wheels detour the tentering chains of the second system, whereby the tentering clamps also travel back to the inlet of the machine after they have been again taken over by the tentering chains of the first transport system.

In the second system the tentering clamps are not entrained for their transport as in the first system. Rather, in the second system, each tentering chain engages the tentering clamps with a drive member, for example, in the form of gear teeth that function as horizontally extending entraining elements. For this purpose, the roller section of each tentering clamp is equipped with corresponding gear teeth on the free surfaces positioned opposite the clamping member. These features assure an entraining of the tentering clamps independently of the guide tracks of the transporting tentering chains. In the transition area between the two transport systems, the tentering clamps are transported by a pushing action applied by one tentering clamp to its neighbor in sequence, whereby the tentering clamps must pass through the transition area long the respective guide tracks in the transition area. For this purpose the individually tentering clamps may be equipped with a stop member that engages the next following tentering clamp for a pushing action to drive the clamps through the transition area.

This pushing action caused by the bumping of one tentering clamp into the one ahead of it, continues for each clamp until the respective clamp is entrained again by the first transport system. The guiding of the clamps as they pass through the transition area takes place exclusively by an upper and a lower transition guide track. While the tentering clamps travel through the transition area, the film web is not released. Thus, any uncontrollable shrinking in the cross-wise direction is positively prevented. The roller section of the tentering clamps, which carries a respective number of guide rollers, is properly guided by the upper and lower transition guide track sections. For this purpose, the roller section has lower outwardly mounted guide rollers and upper horizontally mounted guide rollers. Additionally, at least one guide roller is arranged with a vertical orientation. The vertically oriented guide roller assures in addition to the vertical guiding of its tentering clamp on the lower guide track that the weight of the tentering clamp is properly taken up by the vertically oriented guide roller and introduced into the lower guide track.

Each chain pin of the tentering chains of the first separate transport system is equipped at its upper free end and at its lower end with a horizontally oriented guide roller. In order to transmit the pulling forces imposed on the tentering chain for its transport, the tentering chains are equipped with chain link plates that have the dimensions required for taking up the pulling or tension loads.

The tentering chains are supported on the lower guide track. For this purpose, the lower guide track is constructed to have a C-profile or cross-section that has profile legs of unequal length. Further, at least one of the chain pins or one of the chain link plates of each chain link is equipped with a chain support roller arranged in the area of the lower horizontal guide roller. The chain support roller is also mounted with a vertical orientation.

In order to assure a positive, trouble-free return transition of the tentering clamps from the slower moving second transport system back into the fast moving first transport system, each tentering clamp is preferably equipped with a spacer plate that preferably forms an integral part of the respective tentering clamp body. Such spacer plates do not interconnect the individual tentering clamps, they just space the clamps from one another with a spacing that corresponds to the maximum pitch (T) of the first tentering chains. As mentioned above, the chain pitch is the on-center spacing between two neighboring entraining chain pins of the first tentering chain. This dimension of the spacer plates permits the tentering clamps to space themselves from one another by the pitch T. This adjustment or spacing of the tentering clamps from one another is possible because the bores or recesses in the chain link plates in which the guide roller axes engage are formed as elongated holes. When the tentering clamps are spaced from one another by the pitch T, the spacer plates of two neighboring tentering clamps contact each other, thereby preventing that neighboring tentering clamps come closer to each other than the pitch T. Thus, the pitch T of the tentering clamps is constant as long as the tentering clamps are transported by the tentering chains of the first transport system. However, the pitch between neighboring tentering clamps is reduced when these clamps are transported by the second transport system for the film web shrinking and when the chain pins of the first transport tentering chains no longer engage the tentering clamps. Since the spacer plates are arranged exactly in the rotational center of the entire transport system, the radii of the guide tracks where the tentering chains detour do not have any influence on the spacing between neighboring tentering clamps.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
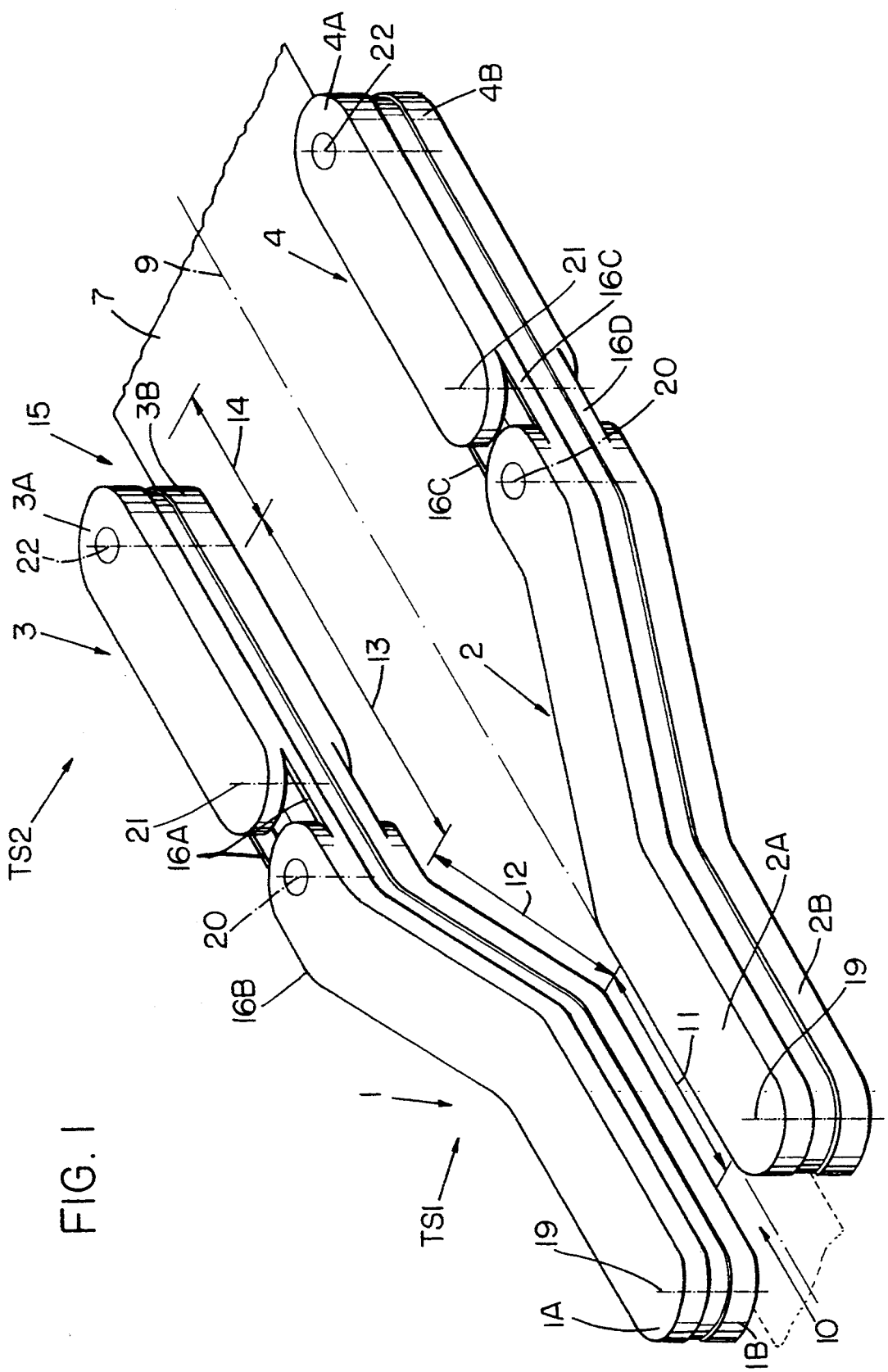
FIG. 1 is a somewhat schematic perspective view of two interconnected transport systems of a film web stretching apparatus of the invention.

The perspective view of FIG. 1 shows a first transport system TS1 and a second transport system TS2. The first transport system TS1 has two sections 1 and 2. The second transport system has two sections 3 and 4. The sections 1 and 3 are interconnected by bridging guide tracks 16A and 16B to be described in more detail below. Similarly, the sections 2 and 4 are interconnected by corresponding bridging guide tracks 16C and 16D. The system sections 1 and 2 of the first transport system TS1 are mirror-symmetrical to each other and relative to a central plane passing through the central longitudinal axis 9 and centrally through a film web 7 to be treated in the apparatus. Similarly, the sections 3 and 4 are mirror-symmetrical to each other. Further, the system section 1 comprises an upper guide track member 1A and a lower guide track member 1B. The system section 2 comprises corresponding members 2A and 2B. The system section 3 comprises members 3A and 3B. The system section 4 comprises members 4A and 4B. All members 1A to 4A and 1B to 4B have a C-shaped sectional shape. The upper guide track member 1A comprises an outer guide rail 5A and an inner guide rail 6A. The lower guide track member 1B comprises an outer guide rail 5B and an inner guide rail 6B. These guide rails form endless loops. The outer guide rails 5A and 5B have a rail leg facing the film web 7. The inner guide rails 6A and 6B have legs facing each other. The guide rails 5A and 6A are interconnected by a connector profile 8. The guide rails 5B and 6B are interconnected by a connector profile 8'. The upper connector profile 8 has a groove that faces downwardly. The lower connector profile 8' has a groove that faces upwardly. The inner guide rails 6A and 6B are shorter than the outer guide rails 5A and 5B. Thus, the respective C-configurations have legs of uneven length in the vertical direction. The other track members are also constructed as just described.

Figure 2:
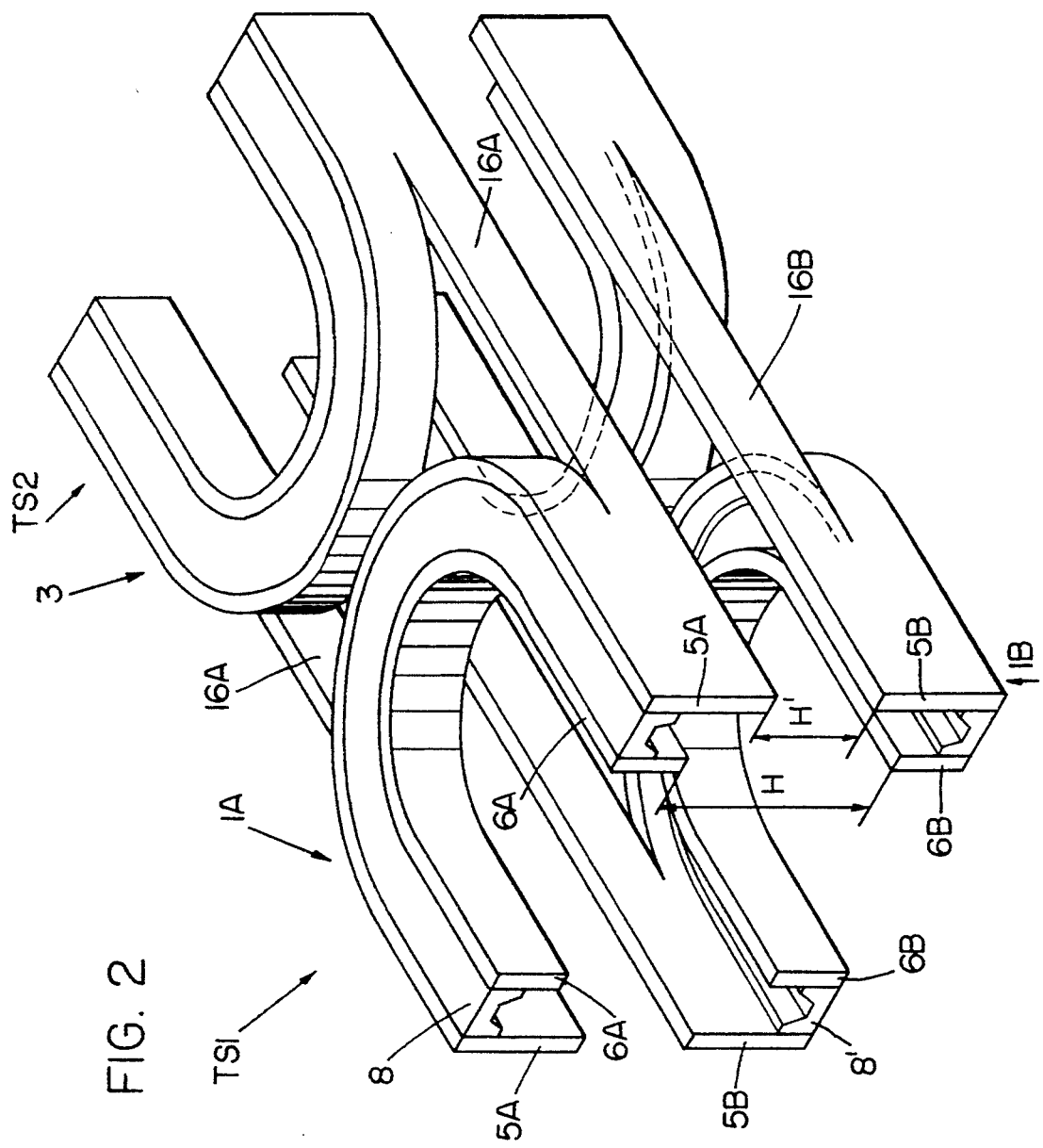
FIG. 2 illustrates, on an enlarged scale compared to FIG. 1, the transition area between the two transport systems.

As shown in FIG. 2, the upper track member 1A and the lower track member 1B together form section 1 of the first transport system TS1. Due to the different vertical length of the guide rails 5A, 5B, and 6A, 6B, the vertical spacing H between the guide rails 6A and 6B is larger than the respective vertical spacing H' between the guide rails 5A and 5B.

Referring again to FIG. 1, the film web 7 travels in the direction of the arrow 10 which designates an inlet zone of the system. The film web 7 has a substantially narrower width across the travel direction at the inlet zone 10 than in the outlet zone 15. The portions of the system sections 1 and 2 extending along the inlet zone 10 and along a heating zone 11 run in parallel to each other. Portions of the sections 1 and 2 extending along the stretching zone 12 diverge from one another to perform the stretching. Further portions of the sections 1 and 2 next to the return point 20 again extend in parallel with each other but at a substantially larger spacing than in the inlet and heating zones 10 and 11. The transition areas between the first and second transport systems TS1 and TS2 extend in parallel to each other and run along a setting zone 13. End portions near the outlet 15 of the transport system TS2 running along a cooling zone 14 also extend in parallel to each other. A certain film shrinking takes place in the axial direction 9 along the setting zone 13.

Figure 3:
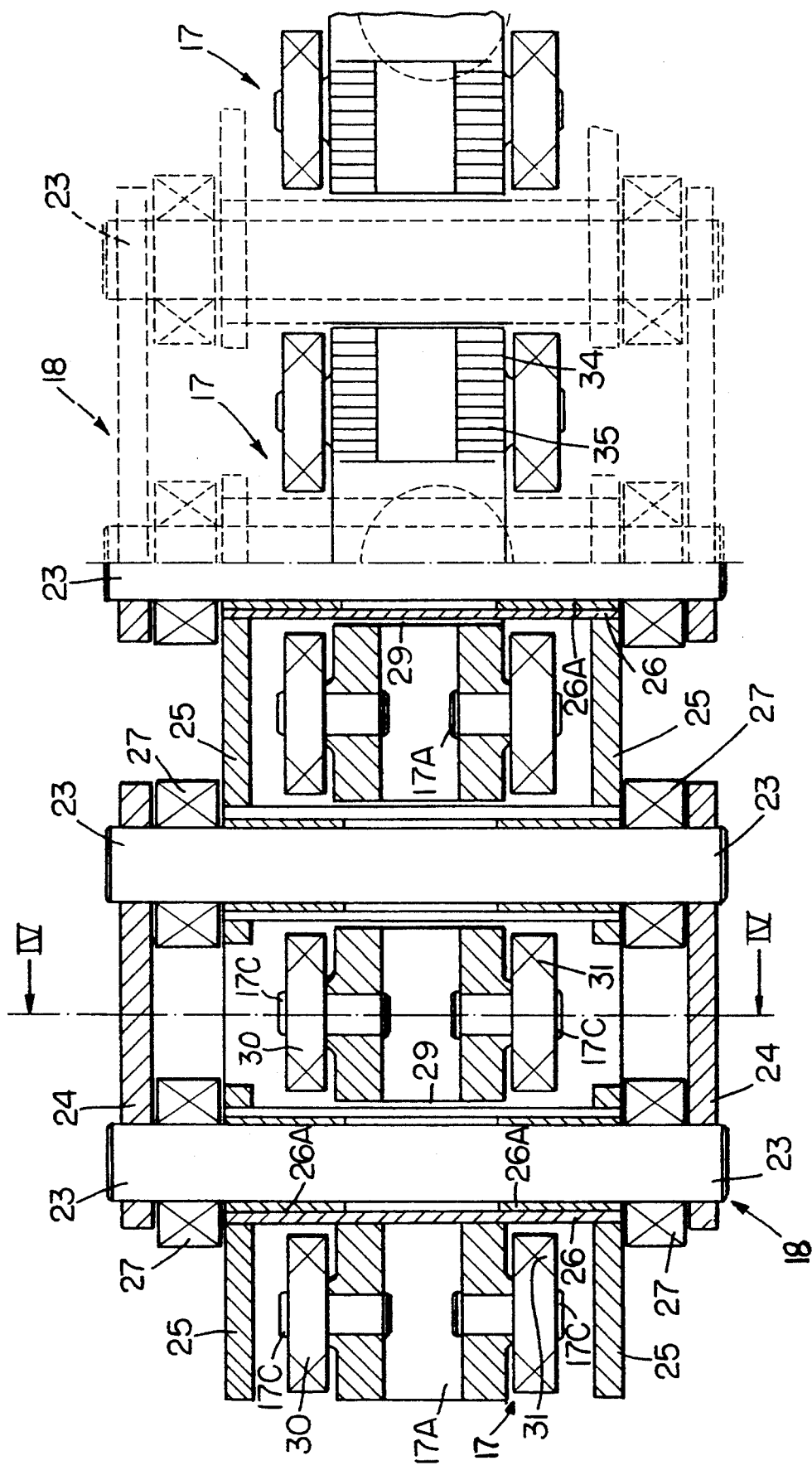
FIG. 3 is partly a sectional view along section line III—III in FIG. 4, and partly a view in the direction of the arrow B in FIG. 4.
Figure 4:
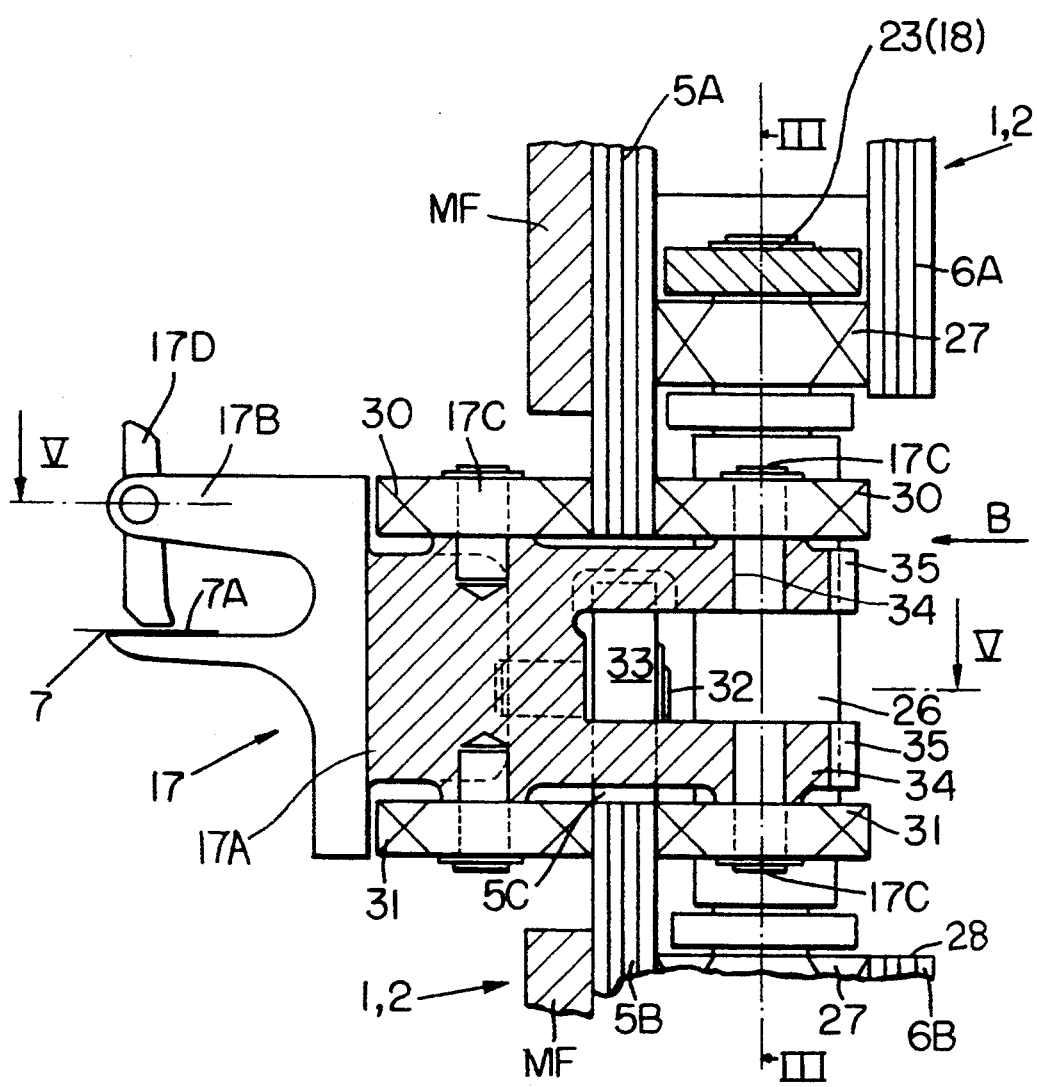
FIG. 4 is a sectional view along section line IV—IV in FIG. 3, and showing the guiding of the tentering chain and of the roller section of a tentering clamp.

Tentering clamps 17 shown in FIGS. 3 and 4, for example, are not shown in FIGS. 1 and 2 for simplicity's sake. Each transport system section 1, 2, 3, and 4 has its own pulling device or tentering chain. The tentering chains 18 of the first transport system TS1 turn around the axes 20. The pulling devices 38, also called tentering chains 38, of the second transport system TS2 turn around axes 22. However, the tentering clamps 17 pass through the transition areas formed by the bridging guide tracks 16A, 16B, 16C, 16D between the two systems TS1 and TS2. During this transition, which will be described in more detail below, the tentering clamps 17 keep holding the film web 7, whereby the axial shrinking of the film web 7 takes place.

Figure 5:
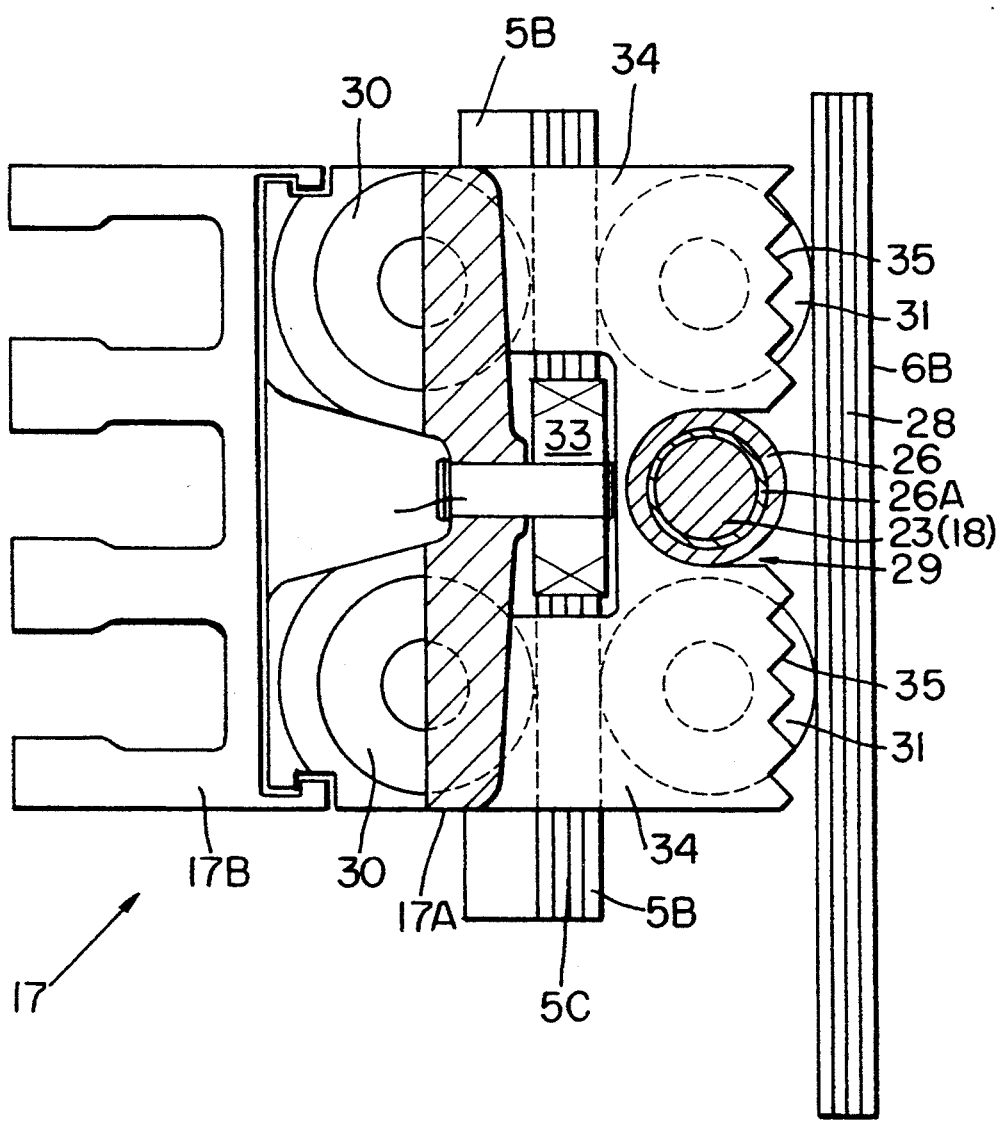
FIG. 5 shows a view of a tentering clamp partially in section along section line V—V in FIG. 4.
Figure 6:
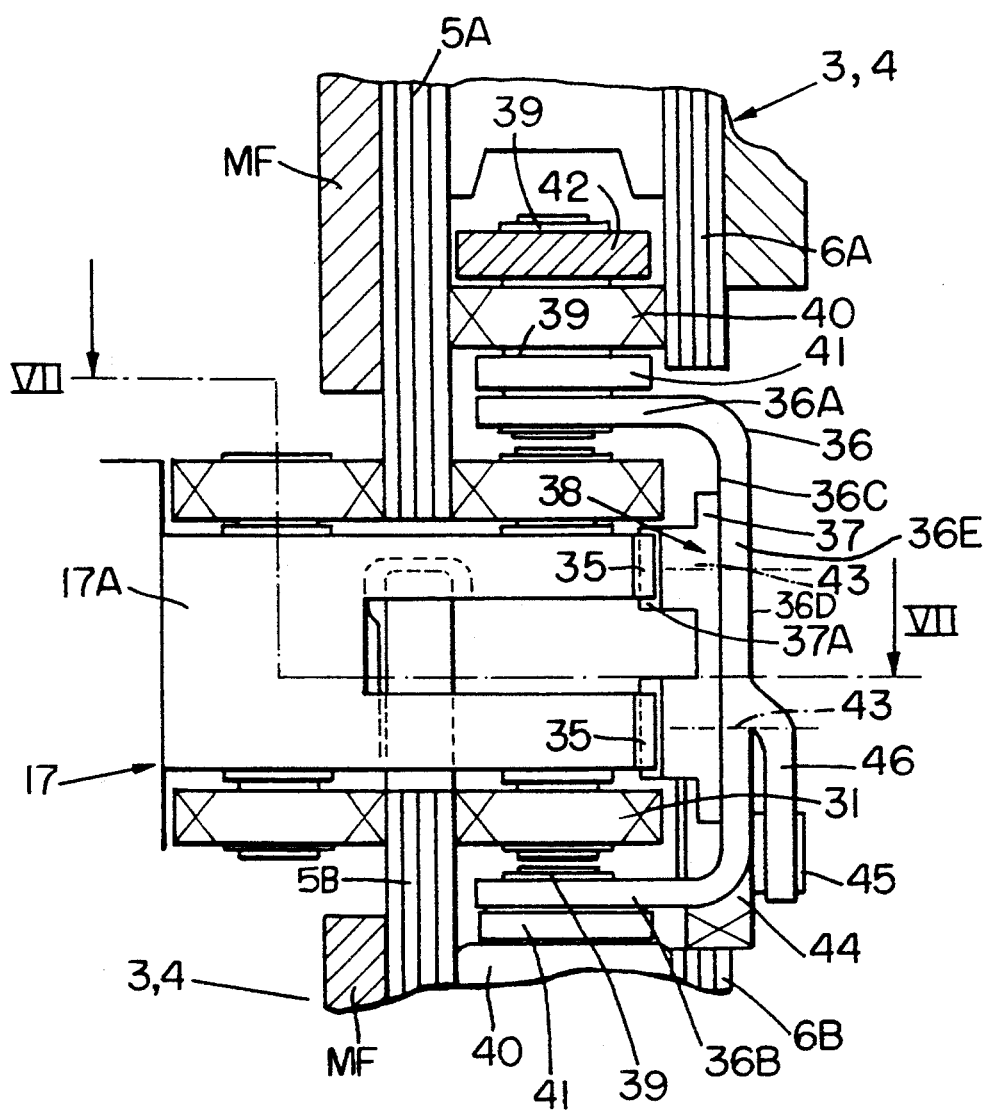
FIG. 6 is a side view, partially in section, of a tentering clamp guided in the guide track or tracks of the second transport system and in engagement with the tentering chain of the second transport system.
Figure 7:
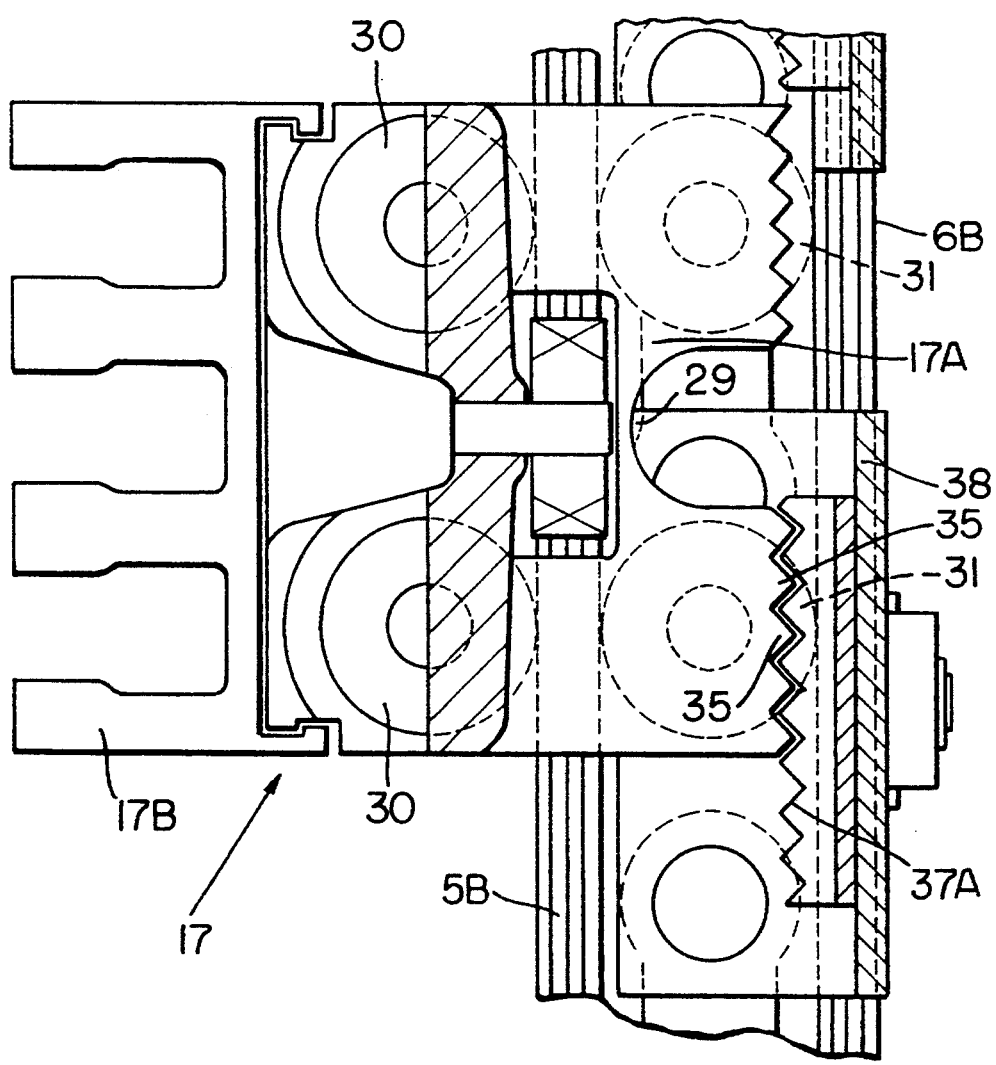
FIG. 7 is a sectional view along section line VII—VII in FIG. 6.
Figure 8:
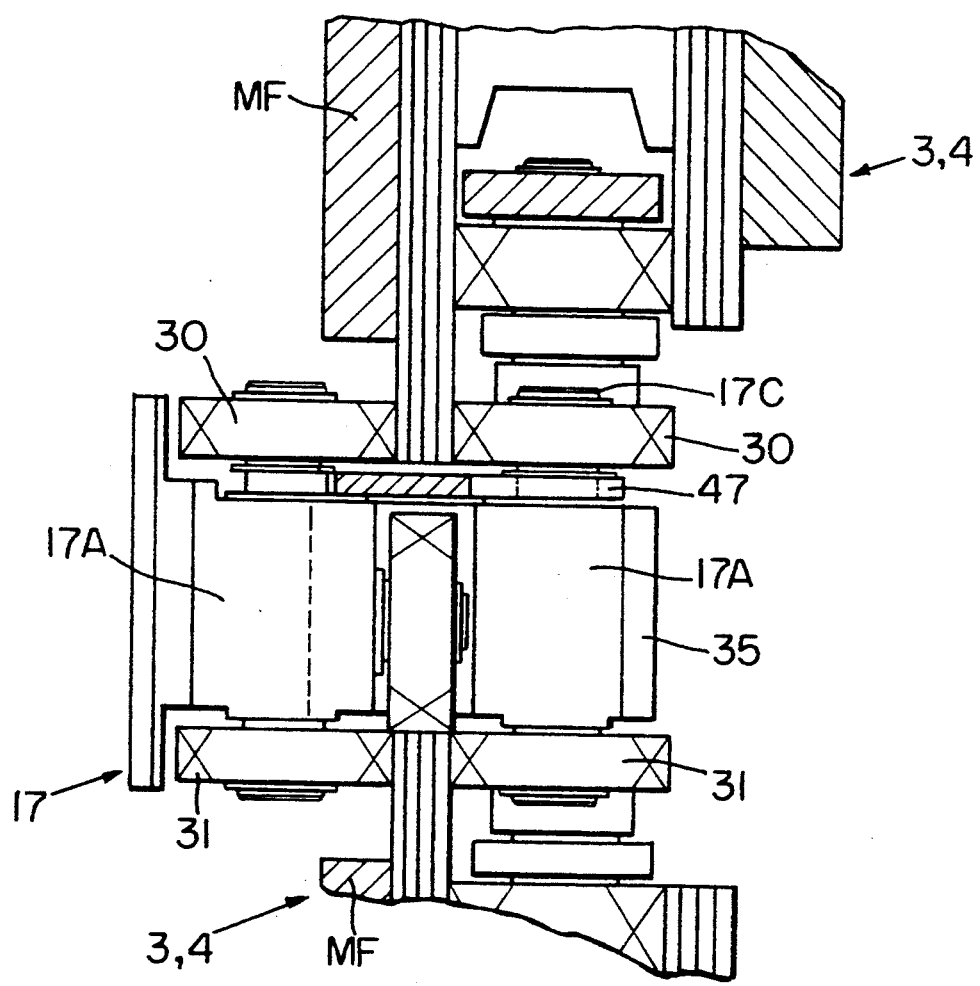
FIG. 8 is a side view, partially in section, and in the viewing direction of the arrow A in FIG. 9, showing the roller section of a tentering clamp engaged in the guide track or tracks of the second transport system, whereby the tentering clamp comprises an integrated spacer plate which also functions as an entraining element.
Figure 9:
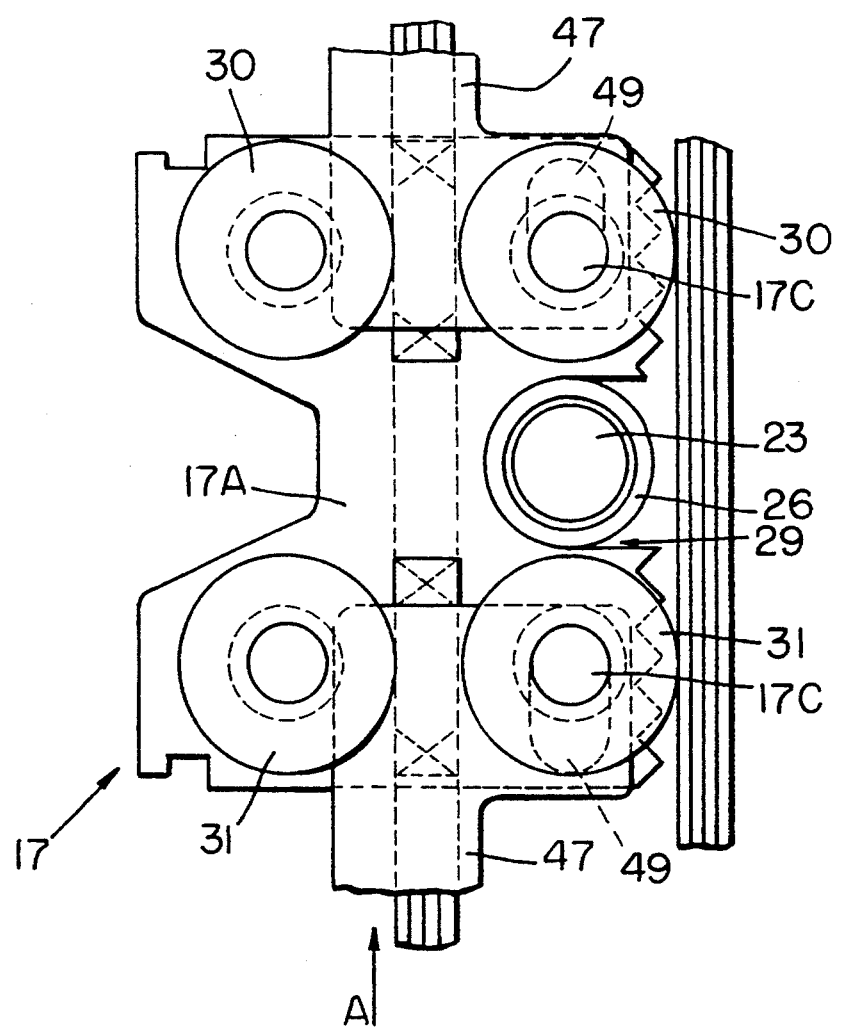
FIG. 9 shows a plan view of the roller section including the entraining and spacer plate according to FIG. 8.

Each system section 1, 2, 3, and 4 comprises a drive wheel rotating about the axes 20, 22 respectively for driving the corresponding tentering chain 18 or 38. The tentering chains 18 are shown in FIGS. 3, 4 and 5 and run in their respective system sections 1, 2 guided by the C-configuration of the guide tracks described above. The tentering chains 38 of the second system TS2 are shown in FIGS. 6 and 7 and run in their respective sections 3, 4. The tentering chains 18 are detoured and guided by guide wheels rotating around the axes 19. The tentering chains 38 turn around a guide wheel on the axes 21 for the second transport system TS2. The detour guide wheels for each section are not shown. Referring further to FIG. 2, the above mentioned transition area is bridged by the guide tracks 16A, 16B, 16C, 16D which are extensions of the outer guide rails 5A and 5B. The bridging or transition guide tracks 16A, 16B, 16C, 16D are straight rail sections that merge from the guide rails 5A and 5B of the first transport system TS1 into the corresponding guide rails of the second transport system TS2.

Referring to FIGS. 3, 4, and 5, a tentering clamp 17 meshes in the first system TS1 with the tentering chain 18 and in the second system TS2 with the tentering chain 38. First, the tentering chain 18 will be described. The chain 18 is constructed as link chains comprising a plurality of chain links. Each chain link comprises two chain pins 23 spaced from each other by the two chain link plates 24, 25 linked to each other by the chain pins 23. The inner chain link plates 25 alternate with outer chain link plates 24 along the length of the endless tentering chains 18. Each chain pin 23 is mounted in a bushing 26 in which the pins 23 are journalled. Preferably, friction reducing sleeves 26A are inserted between the chain pins 23 and the respective bushings 26. The inner chain link plates 25 are connected to the bushings 26, while the outer chain link plates 25 are connected to the outer free ends of the pins 23. The pins 23 are long enough so as to carry running rollers 27 mounted on the chain pins 23 between the inner link plates 25 and the outer link plates 24. These running rollers 27 run along the side surfaces of the guide rails of the transport system sections 1 and 2. The chain pins 23 may be equipped with vertically oriented running rollers for supporting the weight of the tentering chain. Such vertically oriented support rollers are not shown in FIGS. 3, 4, and 5. However, such support rollers could, for example, be mounted in a forked end of the chain pins 23 outside of the outer link plates 24. In another embodiment a vertically oriented chain supporting guide roller could be secured to the tentering chain in such a position that the running tread of the respective guide support roller would run on the support surface 28 of the lower guide rails 6B. As mentioned, a plurality of interconnected chain link plates and bolts form the endless tentering chains 18 in the transport systems TS1 and TS2.

FIG. 3 shows the meshing of the tentering clamp 17 with the tentering chain 18. Two complete tentering clamps 17 are shown. The third clamp on the right-hand end of FIG. 3 is shown broken away. Each tentering clamp rides on one bushing 26 of a chain link, while the next bushing 26 is positioned between two neighboring tentering clamps 17. Referring to FIGS. 4 and 5, each tentering clamp comprises a clamp body including a roller carrying section 17A and a clamp section 17B carrying at least one clamping finger 17D of conventional construction for holding the edge 7A of the film web 7. As best seen in FIG. 5, the roller carrying clamp body section 17A has a U-shaped recess 29 constructed for meshing with the bushings 26. The vertical longitudinal axis of the U-shaped recess 29 extends vertically, namely in the plane of the drawing sheet of FIG. 4, and perpendicularly to the drawing sheet of FIG. 5. The meshing of the recess 29 of each tentering clamp 17 with the bushings 26 of the tentreing chains 18 transports the tentering clamps through the apparatus. The roller section 17A of each tentering clamp 17 carries on vertical studs rotatably mounted horizontally oriented upper running or guide rollers 30 and horizontally oriented lower guide rollers or running rollers 31. The upper guide rollers 30 bear against inner and outer walls of the upper guide rail 5A. The lower guide rollers 31 bear against inner and outer side walls of the lower guide rail 5B. These guide rails 5A and 5B are supported by the machine frame MF as shown in FIG. 4.

A support roller 33 is rotatably mounted to the roller section 17A of the body of the clamp 17 by a stud 32. The tread surface of the support rollers 33 runs on the horizontally extending relatively narrow guide surface 5C of the lower guide rail 5B.

As shown in FIGS. 3, 4, and 5, the roller section 17A of the tentering clamp body is equipped with legs 34, the outer ends of which carry an upper and a lower roller 30, 31. The outwardly facing free ends of these legs 34 are provided with gear teeth 35 forming a toothed rack for transporting the clamps 17 in system TS2.

Referring to FIGS. 6 and 7, the transport of the tentering clamps 37 is taken over by the second transport system TS2 after the tentering clamps 17 have left the meshing with the tentering chain 18 of the first transport system TS1, and after the tentering clamps 17 have passed through the transition area guided by the transition guide tracks 16A, 16B, 16C, 16D as shown in FIGS. 1 and 2. Once the tentering clamps 17 have entered into the sections 3 and 4 of the second transport system TS2, the gear teeth 35 begin to mesh with gear teeth 37A formed in toothed rack elements 37 of the second tentering chain 38. One second tentering chain 38 is mounted in each of the system sections 3 and 4. The toothed rack elements 37 are carried by a tentering cahin body 36 forming part of each of the second tentering chains 38.

FIGS. 6 and 7 illustrate the entrainment of the tentering clamps 17 in the shrinking and setting zone 13 shown in FIG. 1. According to FIG. 6, the second tentering chain 38 also comprises individual chain links forming an endless chain that runs between the guide rails 5A, 6A, and 5B, 6B of the transport sections 3 and 4 of the second transport system TS2. Each of the individual chain links of the tentering chain 38 comprises one of the above mentioned tentering chain bodies 36 formed as a C-bail. The bail 36 has an upper leg 36A and a lower leg 36B. Each leg 36A and 36B has mounted thereto a roller carrying stud 39. These studs 39 extend vertically and axially outwardly of the bail 36. Each of the axially extending studs carries rotatably mounted a horizontally extending guide roller 40. The individual tentering chain bodies or bails 36 are articulated to each other by inner chain plates 41 and by outer chain plates 42, whereby the latter interconnect the free ends of the studs 39 as shown in FIG. 6. The legs 36A and 36B of the tentering chain body or bail 36 are interconnected by a vertically extending portion 36E having an inwardly facing surface 36C and an outwardly facing surface 36D. The toothed rack elements 37 carrying the gear teeth 37A are secured to the inwardly facing surface 36C of the bail 36. The securing may be accomplished, for example, by screws 43 only shown symbolically in FIG. 6. The toothed rack elements 37 are so positioned that their geer teeth 37A can mesh with the gear teeth 35 of the roller sections 37A of the tentering clamps 17.

Each tentering chain body or bail 36 is carrying a vertically oriented support roller 44 that rides on the upwardly facing surface of the guide rail 6B. The support roller 44 is rotatably mounted on a stud 45 that itself is rigidly secured to an arm 46 attached to the bail portion 36E. The bail portion 36E has a recess therein through which the support roller 44 can extend so that it may travel on the upwardly facing horizontal support surface of the guide rail 6B. The recess in the bail portion 36E is not visible in FIG. 6.

FIG. 7 makes it clear again that the transport of the tentering clamps 17 in the second transport system TS2 is accomplished exclusively by the meshing of the teeth 35 on the clamps with the teeth 37A on the tentering chains 38 of the second transport system TS2. Thus, the engagement of the U-shaped recesses 29 in the roller section 17A with the chain pins 23 is not needed for transporting the tentering clamps 17 as long as these clamps are in the second transport system TS2.

Figure 10:
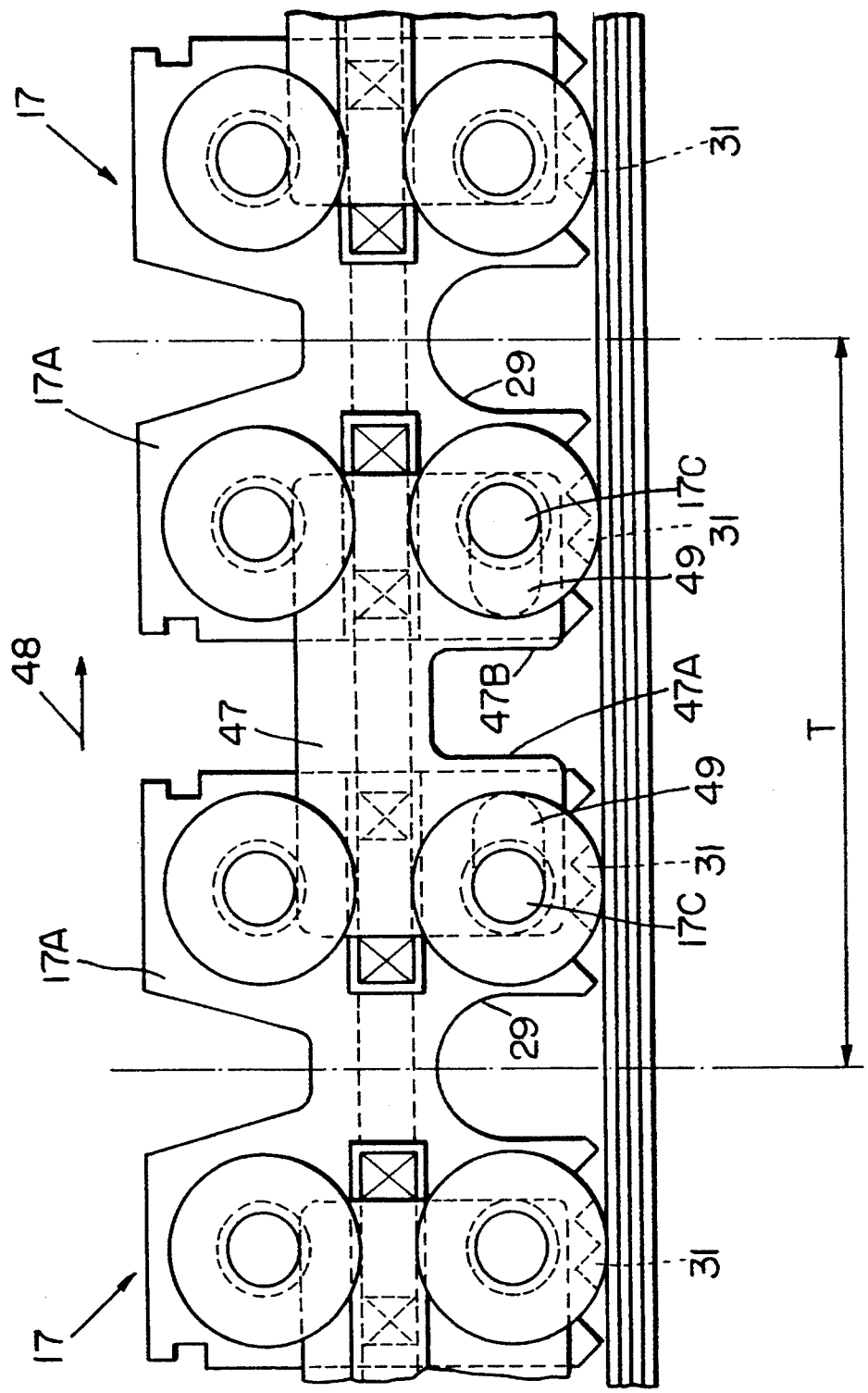
FIG. 10 illustrates a plan view of the roller section of a tentering clamp including the entraining and spacer plate in a position with a maximum pitch T between neighboring tentering clamps.
Figure 11:
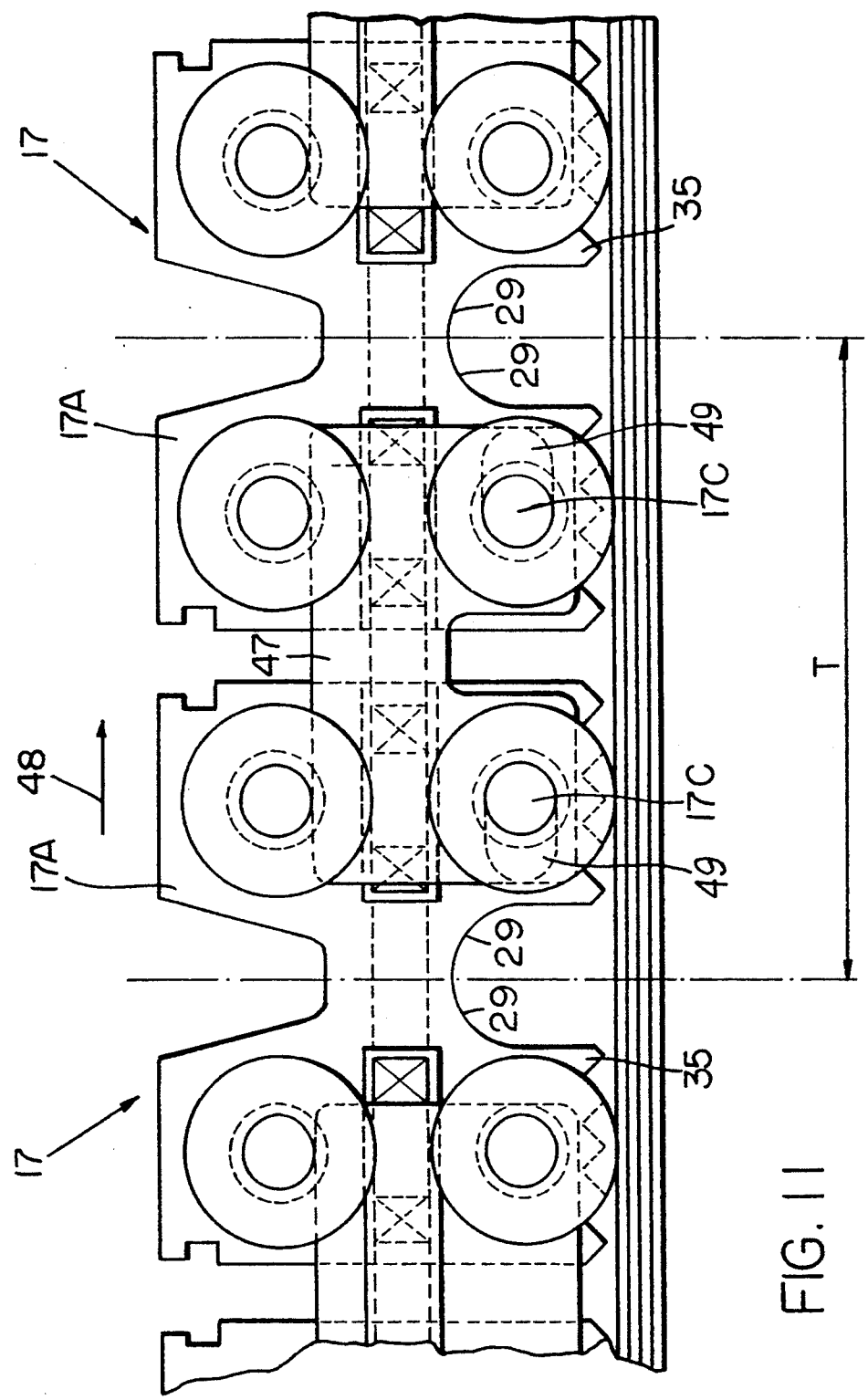
FIG. 11 is a view similar to that of FIG. 10, however showing the tentering clamps in position with a minimal pitch t between neighboring tentering clamps.

FIGS. 3 to 7 make it clear that the individual tentering clamps 17 as they travel along the guide rails 5A, 5B, 6A, 6B, are not interconnected with each other, even when they travel across the transition area formed by the transition or bridging guide rails 16A, 16B, 16C, 16D. FIGS. 8, 9, 10, and 11 illustrate preferred features for assuring a certain transition or transfer of the individual tentering clamps 17 from the first transport system into the second transport system and vice versa. Especially the return transfer from the sound transport system TS2 back into the first transport system TS1 requires special attention because the second transport system with the system sections 3 and 4 runs slower than the transport sections 1 and 2 of the first transport system. Thus, it is preferred that the tentering clamps 17 are interconnected by entraining plates 47. Especially FIGS. 10 and 11 show that each entraining plate 47 has a C-configuration. Each leg 47A, 47B of the entraining plate 47 is provided with an elongated hole 49 that extends in the travel direction 48 of the tentering clamps 17. Due to the interlinking by the entraining plates 47 the clamps 17 form an endless chain. The studs 17C carrying the guide rollers 31 are now long enough to reach into the respective elongated hole 49. Thus, the entraining plate 47 is integrated between the upper end of the roller section 17A and the guide rollers 30, 31 carried by the upper ends of the legs 34 provided with the gear teeth 35 on each tentering clamp 17. The roller sections 17A of the tentering clamps 17 are dimensioned sufficiently solid to take up the loads imposed by the cooperation of the studs 17C with the entraining plates 47. The cooperation between the elongated studs 17C and the elongated holes 49 in the entraining plates 47 permits the adjustment of the tentering clamps 17 relative to each other in the travel direction 48 from the maximum pitch T to the minimum pitch t and vice versa. FIG. 10 shows the relative position with the maximum pitch T between on-center locations of neighboring tentering clamps 17. FIG. 11 illustrates the minimum pitch t between the respective on-center positions of neighboring tentering clamps 17.

The shrinking and stretching of the film web 7 is thus assured within the differential range between the maximum pitch T and the minimum pitch t when the tentering clamps 17 are linked to each other by the entraining plates 47. The entraining plates 47 assure a positive transfer of the tentering clamps 17 from one transport system to the other and vice versa, even if the systems run at different speeds. However, the system also works satisfactorily without these entraining plates 47.

Although the invention has been described with reference to specific example embodiments, it will be appreciated that it is intended to cover all modifications and equivalents within the scope of the appended claims.

What I claim is:

1. An apparatus for the simultaneous biaxial stretching and axial shrinking of a thermoplastic film web, comprising a plurality of tentering clamps (17) for gripping longitudinal edges of said film web, two separate transport systems (TS1, TS2) including separate first and second endless tentering chains (18, 38) for moving said tentering clamps through said apparatus, said transport systems comprising a first transport system including a first section (1) and a second section (2) each having a first portion and a second portion, said first portions extending in parallel to each other, said second portions diverging from each other at an angle to a transport direction (10) of said film web (7) and a second transport system also including a first section (3) and a second section (4) extending in parallel to each other, said first transport system comprising endless rails forming first guide tracks for said first tentering chains, said second transport system comprising separate endless rails forming second guide tracks for said second tentering chains, and transition tracks (16A, 16B, 16C, 16D) interconnecting only portions of said first and second guide tracks for transferring said tentering clamps from said first transport system to said second transport system and vice versa while circulating said first and second tentering chains independently of each other respectively in said first and second transport systems (TS1, TS2).

2. The apparatus of claim 1, wherein said first and second transport systems comprise means for driving the respective first and second tentering chains at different transport speeds, each transport system comprising an upper and a lower rail section (1A, 1B, 2A, 2B, 3A, 3B, 4A, 4B) for guiding said first and second tentering chains, said tentering clamps and said tentering chains comprising means meshing with each other for moving said tentering clamps independently in each transport system, whereby each tentering clamp (17) is operatively engaged with each tentering chain (18, 38) within the respective transport systems in a temporary manner, each tentering clamp (17) comprising a clamping section (17B) and a roller section (17A), wherein each roller section (17A) comprises, for the transport of the tentering clamps (17) in the first transport system, on a side opposite clamping section (17B), centrally positioned a U-shaped recess (29) in which a free cylindrical portion of a first chain bolt (23) of said first tentering chains is engaged, and wherein second chain bolts (23) of chain links of said first tentering chain (18) reach into a space between neighboring roller sections (17A), said meshing means of said tentering clamps further comprising at least one entraining element (35) for transporting said tentering clamps (17) in said second transport system (TS2), said entraining element being positioned on a side of each roller section (17A) opposite said clamping section (17B), said entraining element (35) operatively engaging with a further entraining element (37) provided on said second tentering chain (38) of the second transport system (TS2), and wherein said operatively engaging of said entraining elements (35, 37) are independent of a pitch of said second tentering chain (38).

3. The apparatus of claim 1, wherein said rails of said first and second guide tracks (1A, 1B, 2A, 2B, 3A, 3B, 4A, 4B) of said transport system sections (1, 2, 3, 4), comprise an approximately C-shaped cross-sectional configuration, said rails being arranged opposite to each other in pairs in such a manner that profile legs of said configurations are arranged in vertical planes opposite each other.

4. The apparatus of claim 3, wherein said profile legs that are positioned opposite to each other have the same vertical height in each rail and form outer and inner guide rails (5A, 5B, 6A, 6B).

5. The apparatus of claim 4, wherein side surfaces of two guide rails (5A, 5B) arranged opposite each other perform a horizontal guide function for said tentering clamps.

6. The apparatus of claim 4, wherein a horizontal plane of a lower guide rail (5B) constitutes a vertical roller guide surface for said tentering clamps.

7. The apparatus of claim 4, wherein a vertical height of said rails (5A, 5B) is larger than a vertical height of neighboring rails (6A, 6B).

8. The apparatus of claim 1, wherein said first tentering chains (18) comprise chain links including chain pins (23) and chain plates (24, 25) which interconnect facing ends of said chain pins, wherein each chain pin (23) carries at its free end one guide roller (27), and wherein said guide rollers (27) are guided respectively between an outer and an inner rail (5A, 6A and 5B, 6B).

9. The apparatus of claim 8, wherein at least one chain pin (23) of each chain link carries a rotatably mounted support roller (33) which vertically supports said tentering chain (18).

10. The apparatus of claim 9, wherein a horizontal surface (28) of said guide rail (6B) forms a tread surface for support rollers of said chain links.

11. The apparatus of claim 2, wherein said second tentering chains (38) of said second transport system comprise chain links with a chain bail (36) having a C-configuration with bail legs (36A, 36B), two axles (39) carried by said legs of said chain bail (36) for taking up one each horizontally positioned guide rollers (40), said axles (39) being arranged on the respective outer side of said bail legs (36A, 36B) of said chain bail (36) and extending in axial alignment with each other, an inner chain plate (41) connected between each guide roller (40) with the respective bail leg, an outer chain plate (42) connecting a free end of said axles (39), at least one entraining element (37) connected to said chain bail (36) in a form-locking or force-transmitting manner, said entraining element comprising intermeshing gears (37A) for engaging said entraining element (35) of said tentering clamps, and at least one support roller (44) connected to said chain bail (36) for vertically supporting each chain bail (36).

12. The apparatus of claim 11, wherein said guide rollers (40) are guided between a respective outer and a respective inner rail (5A, 6A and 5B, 6B) of said second transport system (TS2).

13. The apparatus of claim 2, further comprising at least one entraining plate (47) for interconnecting two neighboring tentering clamps (17), each entraining plate (47) having two longitudinal holes (49) for taking up a roller axis (17C) so that said entraining plate (47) is connected to each of said two neighboring tentering clamps in a position variable manner permitting a pitch (T) between said neighboring tentering clamps to be varied.

14. The apparatus of claim 13, wherein said entraining plate is connected to said tentering clamps on said roller section having said U-shaped recess (29).

* * * * *